(12) United States Patent
Cousineau

(10) Patent No.: US 10,975,903 B2
(45) Date of Patent: Apr. 13, 2021

(54) LOCKING DRILL BIT TOOL AND STABILIZING SETTING TOOL HEAD SYSTEM

(71) Applicant: Robert Cousineau, Ottawa (CA)

(72) Inventor: Robert Cousineau, Ottawa (CA)

( * ) Notice: Subject to any disclaimer, the term of this patent is extended or adjusted under 35 U.S.C. 154(b) by 180 days.

(21) Appl. No.: 16/210,930

(22) Filed: Dec. 5, 2018

(65) Prior Publication Data

US 2019/0170175 A1 Jun. 6, 2019

(30) Foreign Application Priority Data

Dec. 5, 2017 (CA) .................................. CA 2987589

(51) Int. Cl.
 *F16B 13/04* (2006.01)
 *F16B 13/06* (2006.01)
 *E04B 1/41* (2006.01)

(52) U.S. Cl.
 CPC .............. *F16B 13/066* (2013.01); *E04B 1/40* (2013.01)

(58) Field of Classification Search
 CPC .. F16B 13/0841; F16B 13/002; F16B 13/066; F16B 13/0858; B25B 21/007
 USPC ....................................................... 411/29–31
 See application file for complete search history.

(56) References Cited

U.S. PATENT DOCUMENTS

| | | | | |
|---|---|---|---|---|
| 3,123,370 A * | 3/1964 | Unander | ............. | F16B 13/0858 411/31 |
| 3,202,035 A * | 8/1965 | Rosselet | ............. | E21D 21/0046 411/31 |
| 4,007,795 A * | 2/1977 | Gawron | ................ | B25B 21/007 173/50 |
| 4,138,779 A * | 2/1979 | Weber | ..................... | B25C 1/047 29/243.517 |
| 4,386,882 A * | 6/1983 | Bereiter | ................ | F16B 13/002 411/387.1 |
| 4,702,654 A * | 10/1987 | Frischmann | .......... | F16B 13/065 411/31 |
| 5,816,760 A * | 10/1998 | Mattner | ................ | F16B 13/004 411/30 |
| 5,988,964 A * | 11/1999 | Lins | .................... | F16B 13/0858 411/30 |
| 6,012,358 A * | 1/2000 | Lins | ......................... | B25B 31/00 81/13 |
| 6,213,697 B1 * | 4/2001 | Uejima | ................. | F16B 13/004 411/30 |
| 6,648,557 B1 * | 11/2003 | Morrow | ............. | E21D 21/0026 405/259.1 |
| 8,087,850 B2 * | 1/2012 | Craig | .................... | E21D 21/008 405/259.4 |
| 2018/0258972 A1 * | 9/2018 | Pregartner | ............. | E04C 5/122 |

* cited by examiner

*Primary Examiner* — Gary W Estremsky
(74) *Attorney, Agent, or Firm* — US IP Attorneys, P.C.; Timothy Marc Shropshire

(57) ABSTRACT

The present disclosure provides for a system to secure an anchor within a bore hole comprising a drill bit tool to be connected and secured to an improved setting tool head. The system is also comprised of an anchor removably secured to the setting tool head to optimize the setting strength of the anchor. The system is also comprised of bullets having preferred size ranges to further optimize the setting of various anchors.

7 Claims, 5 Drawing Sheets

LOCKING DRILL BIT TOOL AND STABILIZING SETTING TOOL HEAD SYSTEM

FIELD

The invention relates to the field of anchors, and more specifically to a locking drill bit tool and stabilizing tool and setting tool head system for use in cementuous materials with anchors.

BACKGROUND

Anchors are conventionally used in construction to attach various components of a building construction to an overhead ceiling or other structure. Such components to be attached can relate to, for example, services that provide plumbing, electrical, drainage, sprinkler system piping and drop ceilings. From these anchors, which are usually of the sleeve type or wedge type variety, all the above services and ceilings are suspended or secured.

Conventionally, in setting anchors in concrete to suspend an awning, for example, a hole is pre-drilled in the surface to which the anchor is to be applied, and then the anchor is inserted into the pre-drilled hole. However, when setting such anchors in concrete it is not uncommon for such anchors to weaken and loosen over time, particularly in situations where cracking or chipping of the concrete around the pre-drilled hole has occurred.

Furthermore, studies have revealed that cracking can typically occur in the concrete element, and that such cracks can significantly impact the performance of anchors. Cracks can originate on a concrete beam or slab in a variety of ways, such as creep, temperature settlement of the support or foundation, thermal expansion and contraction stress overload, or from a natural disaster such as an earthquake or flood. In such circumstances, the situation can arise where, if one such concrete anchor fails and lets go, the remaining anchors, by virtue of the weight they additionally assume in light of such failure, can also similarly collapse and fail.

It has been found that enlarging the lower (interior) part of the pre-drilled hole can allow for the use of anchors in a more secure manner. It has further been found that providing a pre-drilled hole with an enlarged, conical lower end can be advantageously provided by an expansion anchor having an anchor with spreading lamellae, including a carbide bit on at least one of the lamellae, whereby tightening of a nut and washer, which are flush with the bore hole, would cause the cone tip to move back, upwards relative to the bottom of the hole, and into the anchor to spread the lamellae.

It is also desirable that in lieu of a carbide bit, cutters could be provided to further expand radially into the bore hole. Such cutters would be shaped to optimally expand and set the anchor into the bore hole.

SUMMARY

In an aspect, the present disclosure provides an expansion anchor system comprising: a drill bit tool comprised of at least one elongated axial aperture; a setting tool head removably secured to the drill bit tool further comprising a stabilizer, a locking member and at least one locking ridge; an anchor removably secured to the setting tool head, the anchor further comprising: at least one carbide bit to expand a bore hole; and, at least one receiving groove to lock with the locking member and transfer rotary movement from setting tool to the anchor; and, a bullet connected to the anchor to facilitate a radial expansion of the anchor.

BRIEF DESCRIPTION OF THE DRAWINGS

The following figures serve to illustrate various embodiments of features of the disclosure. These figures are illustrative and are not intended to be limiting.

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

Figure 1:
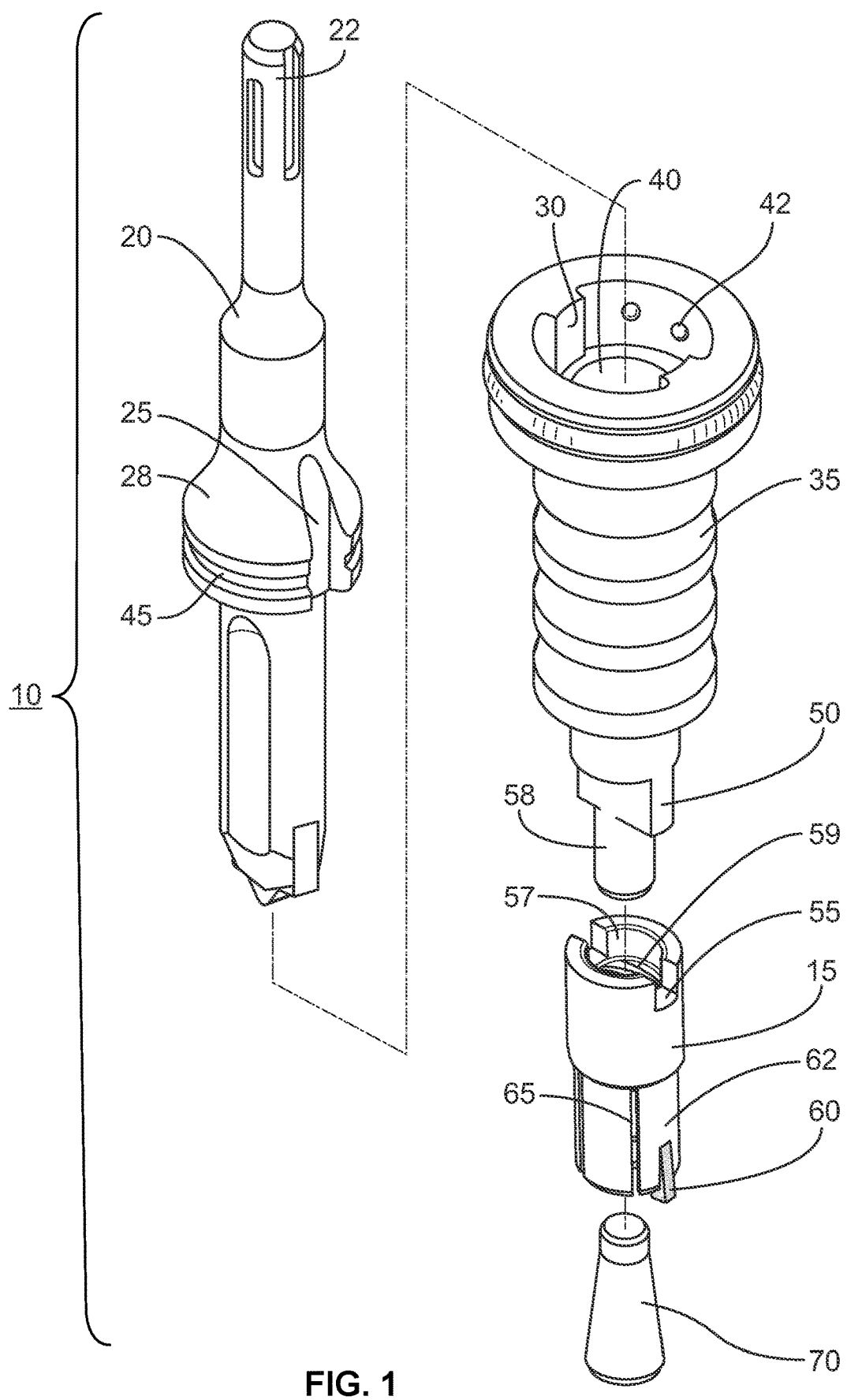
FIG. 1 is a perspective exploded view of a system to secure an anchor within a bore hole, according to an embodiment of the present disclosure.
Figure 2:
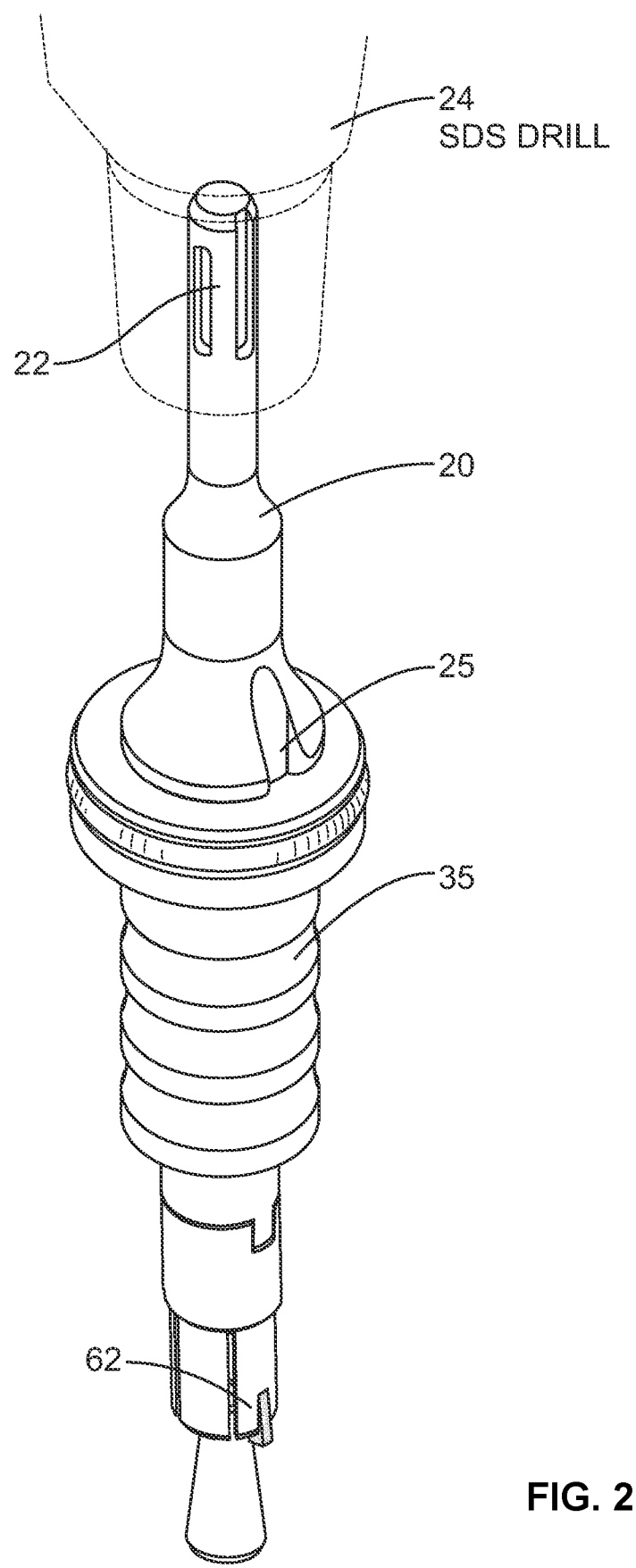
FIG. 2 is a perspective view of the system to secure an anchor within a bore hole, according to an embodiment of the present disclosure.

With reference to FIGS. 1 and 2 and according to an embodiment of the present disclosure, a system 10 to secure an anchor 15 within a bore hole (not shown) is shown. The system 10 is preferably comprised of a drill bit tool 20, the drill bit tool 20 having a connecting member 22 to connect to a SDS drill 24. A worker skilled in the art would appreciate that the connecting member 22 of the drill bit tool 20 could be configured and adapted to connect to a multitude of drills without departing from the scope of the present disclosure. The drill bit tool 20 is further comprised of at least one elongated axial aperture 25 positioned on a central portion 28 of the drill bit tool 20. The central portion 28 protrudes radially from the drill bit tool 20. The at least one elongated axial aperture 25 is constructed and arranged to receive at least one corresponding locking ridge 30 of a setting tool head 35. Indeed, the setting tool head 35 of the system 10 is comprised of a central aperture 40 to receive a lower portion of the drill bit tool 20. At least one locking ridge 30 is positioned on and protrudes inwardly from an inner perimeter of the setting tool head 35. The setting tool head 35 is further comprised of ball bearings 42 positioned within and protruding inwardly from the central aperture 40. The ball bearings 42 connect within a radially recessed area 45 positioned on the central portion 28 of the drill bit tool 20. As such, to connect and secure the drill bit tool 20 to the setting tool head 35, the drill bit tool 20 is inserted within the central aperture 40 of the setting tool head 35, and the elongated axial aperture 25 of the drill bit tool 20 is aligned with the corresponding at least one locking ridge 30 of the setting tool head 35. Continued insertion of the drill bit tool 20 within the central aperture 40 of setting tool head 35 is required until the ball bearings 42 lock within the radially recessed area 45. Once the ball bearings 42 are within the radially recessed area 45, the drill bit tool 20 is secured within the setting tool head 35 and one cannot rotate independently from the other. Such an independent rotation is not desired, as it prevents the drill 24 from properly setting the anchor 15 within the bore hole (not shown). The setting tool head 35 is further comprised of a locking member 50 positioned at a lower end of the setting tool head 35 to engage a receiving groove 55 of the anchor 15. A worker skilled in the art would appreciate that although the locking member 50 is shaped like a hyperrectangle, other shapes and sizes are possible, provided that the locking member 50 is shaped to be flushly secured within at least one receiving groove 55 of the anchor 15. Indeed, the anchor 15 is removably secured to the setting tool head 35 and further comprised of at least one receiving groove 55 configured to receive the locking member 50 of the setting tool head 35. The receiving groove 55 is positioned on an upper portion of the anchor 15. The setting tool head 35 is also comprised of a stabilizer 58 positioned at the lowermost end of the setting tool head 35. The stabilizer 58 is cylindrically shaped to fit into a cavity 57 of the anchor 15 and flushly against the crest of the threaded inner walls 59 of the anchor 15. Indeed, the connection between the setting tool head 35 and the anchor 15 preferably stabilizes the anchor 15 from sideways movement during drilling and setting of the anchor 15 and keeps the setting tool head 35 rotationally locked into the anchor 15. The anchor 15 is further comprised of at least one carbide bit 60 positioned on a spreading lamella 62 at a lowermost end of the anchor 15. The carbide bit 60 positioned in the lamella 62 protrudes radially from the anchor 15. The carbide bit 60 provides additional strength to the anchor 15 to dig into the bore hole (not shown) and create the necessary expanded bore hole (not shown) to secure the anchor 15 therein. A worker skilled in the art would appreciate that although the carbide bit 60 is positioned on one of the spreading lamellae, the anchor 15 could be machined such that the spreading lamellae could have sharper edges and be shaped as cutters to cut into and create the bore hole (not shown). The anchor 15 is also comprised of at least two slits 65 in between adjacent spreading lamellae 62 positioned at the lower end of the anchor 15. The slits 65 allow the lamellae 62 to expand radially around a bullet 70 to gradually set the anchor 15. A worker skilled in the art would appreciate that the bullet 70 is partially secured within the anchor 15 before the anchor 15 and bullet 70 are inserted into the bore hole. The bullet 70 is conically-shaped such that the anchor 15 expands radially around the bullet 70 to set within the bore hole (not shown).

Figure 5:
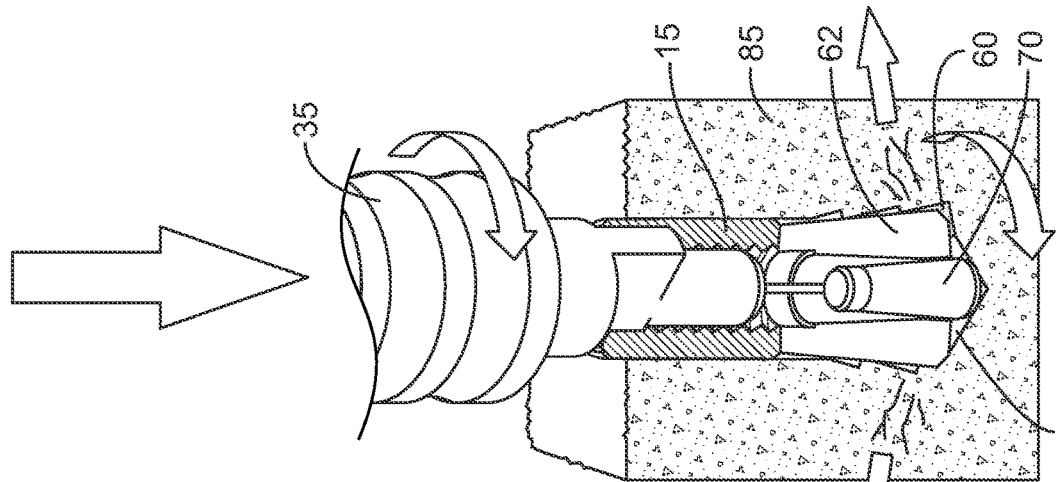
FIG. 5 is a front cutaway view of the system to secure an anchor within a bore hole, showing the rotation of the drill bit tool and setting of the anchor, according to an embodiment of the present disclosure.
Figure 4:
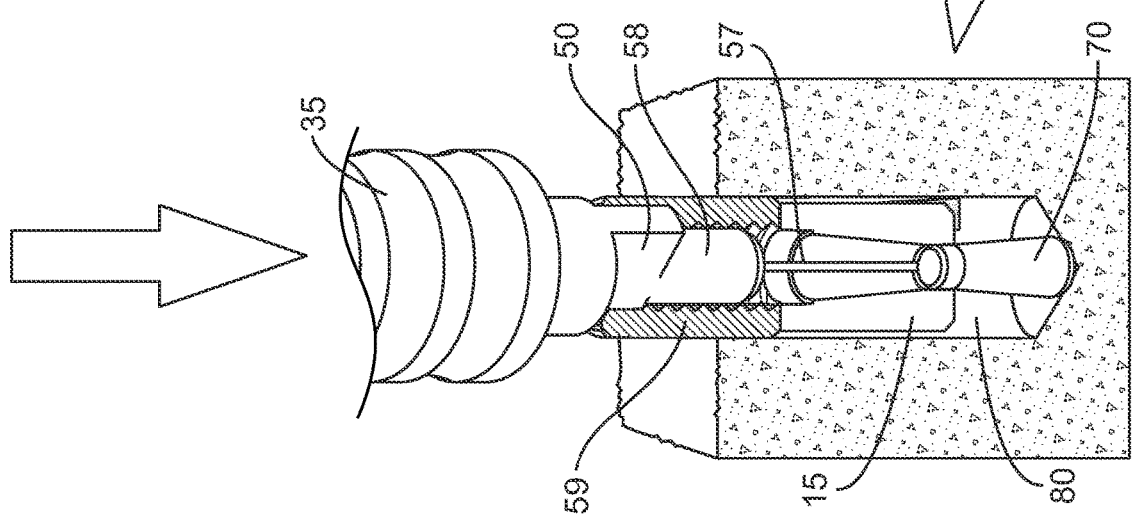
FIG. 4 is a front cutaway view of the system to secure an anchor within a bore hole, once the setting tool head has been secured to the anchor and the anchor has been placed within the bore hole, according to an embodiment of the present disclosure.
Figure 3:
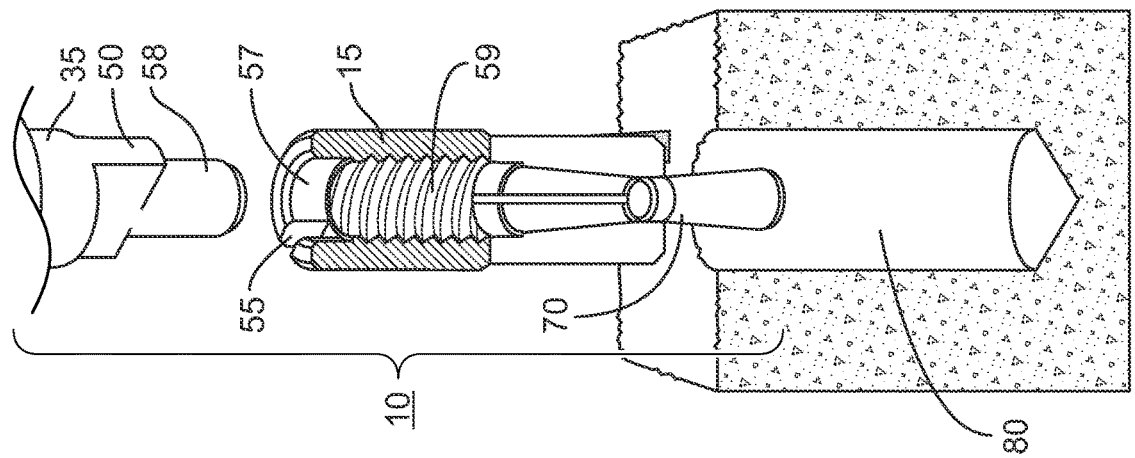
FIG. 3 is a front cutaway view of the system to secure an anchor within a bore hole, before a setting tool head has been secured to an anchor and before the anchor has been inserted into the bore hole, according to an embodiment of the present disclosure.

With reference to FIGS. 3, 4 and 5 and according to an embodiment of the present disclosure, the system 10 is shown securing an anchor 15 within the pre-drilled bore hole 80.

With specific reference to FIG. 3, the bullet 70 is shown positioned within and secured to the anchor 15. The locking member 50 and stabilizer 58 of the setting tool head 35 are aligned with the receiving groove 55 and cavity 57 of the anchor 15, respectively.

With specific reference to FIG. 4, the locking member 50 of the setting tool head 35 has been inserted within the receiving groove (not shown) of the anchor 15. The stabilizer 58 has similarly been inserted into the cavity 57 of the anchor 15. As shown, the stabilizer 58 is flush with the crest of the threaded inner wall 59 of the anchor 15 to increase stability and reduce the undesired sideways movement of the anchor 15. The anchor 15 and bullet 70 have been inserted within the bore hole 80. However, the drill (not shown) has not yet begun drilling and rotating the setting tool head 35.

With reference to FIG. 5, the drill (not shown) is operating and hammering and spinning the drill bit tool (not shown), which in turn hammers and spins the setting tool head 35. Continued hammering and rotating of the setting tool head 35 correspondingly hammers and rotates the anchor 15. As the bullet 70 is positioned adjacent the floor of the bore hole 80, continued rotation and hammering of the drill (not shown) forces the anchor 15 downwardly and around the bullet 70. The carbide bit 60 of the anchor 15 spins and scrapes away at the outlying cementuous material 85, causing the lamellae 62 of the anchor 15 to expand radially and thusly set the anchor 15 to an undercut position. The setting tool head 35 can then be removed from the anchor 15.

Figure 6:
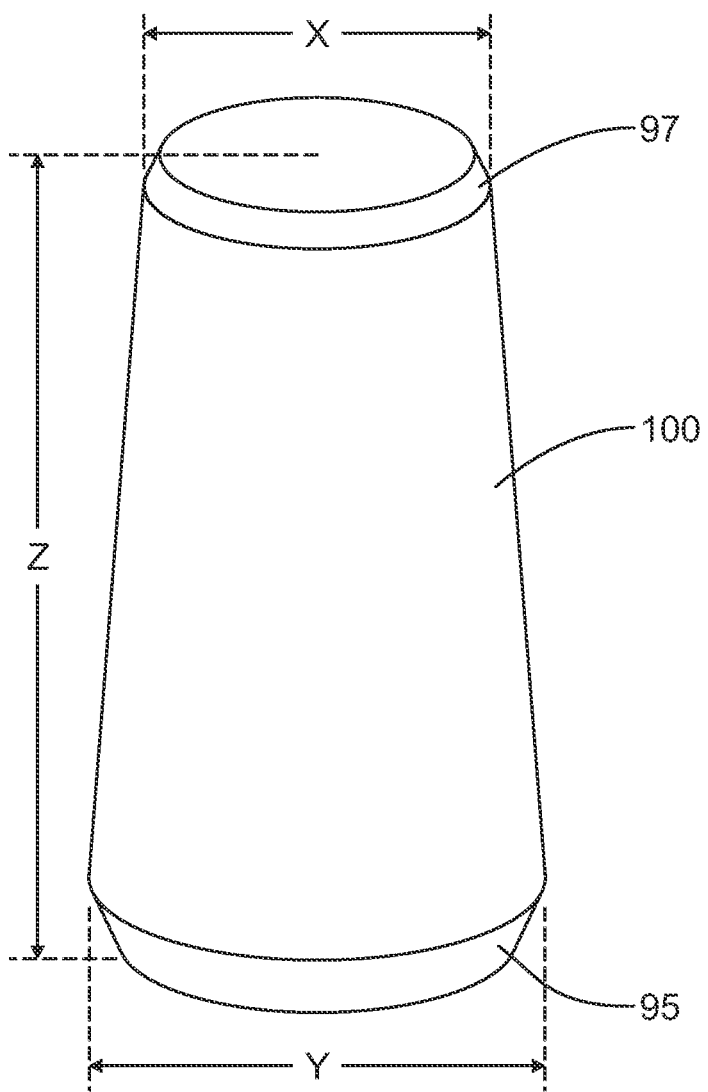
FIG. 6 is a perspective view of a bullet to secure an anchor within a bore hole, according to another embodiment of the present disclosure.

With reference to FIG. 6 and according to an embodiment of the present disclosure, an improved bullet 200 is shown, preferably comprised of 1018 carbon steel or a comparable carbon steel of equal or higher grade. The bullet 200 has curved upper and lower surfaces 95, 97 and has a sloping outer wall 100. Through detailed testing, it has been found that there are various optimal sizes for bullet 200 depending on the standard size of anchors (not shown). A worker skilled in the art would appreciate that typically anchors (not shown) are ¼ inch, ⅜ inch and ½ inch in diameter. In the present disclosure, an upper diameter of the bullet 200 is defined by X, a lower diameter of the bullet 200 is defined by Y, and a height of the bullet 200 is defined by Z. It has been found that by constructing a harder 1018 carbon steel alloy bullet 200 and having optimal upper, lower diameters X, Y and optimal height Z as defined by the Table A below, optimal tension and shear strength of the anchor (not shown) are achieved and defined by Table A.

TABLE A

| Anchor Size (inches) | Bullet upper diameter X (mm) | Bullet lower diameter Y (mm) | Bullet height Z (mm) |
| --- | --- | --- | --- |
| ½ | 9.14-9.22 | 10.03-10.11 | 19.54-19.94 |
| ⅜ | 7.61-7.71 | 8.10-8.20 | 14.80-15.19 |
| ¼ | 4.17-4.27 | 5.08-5.18 | 9.93-10.31 |

Figure 7:
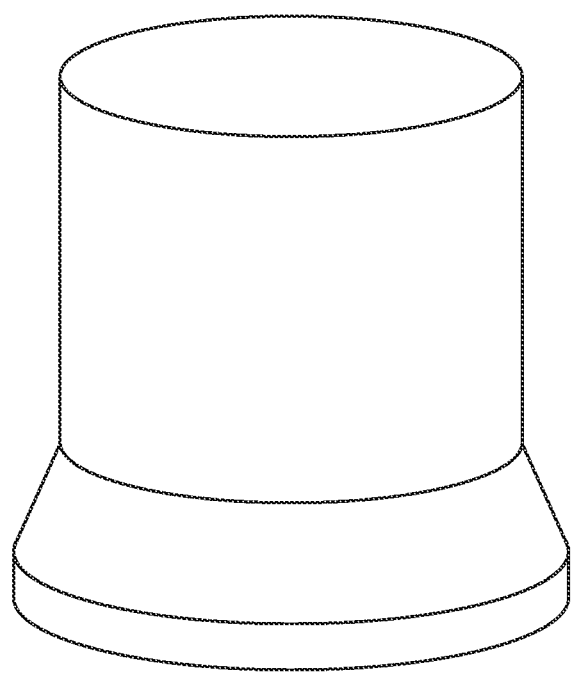
FIG. 7 is a perspective view of a bullet of the system to secure an anchor within a bore hole, according to another embodiment of the present disclosure; and, FIG. 8 is another perspective view of a bullet of the system to secure an anchor within a bore hole, according to yet another embodiment of the present disclosure.
Figure 8:
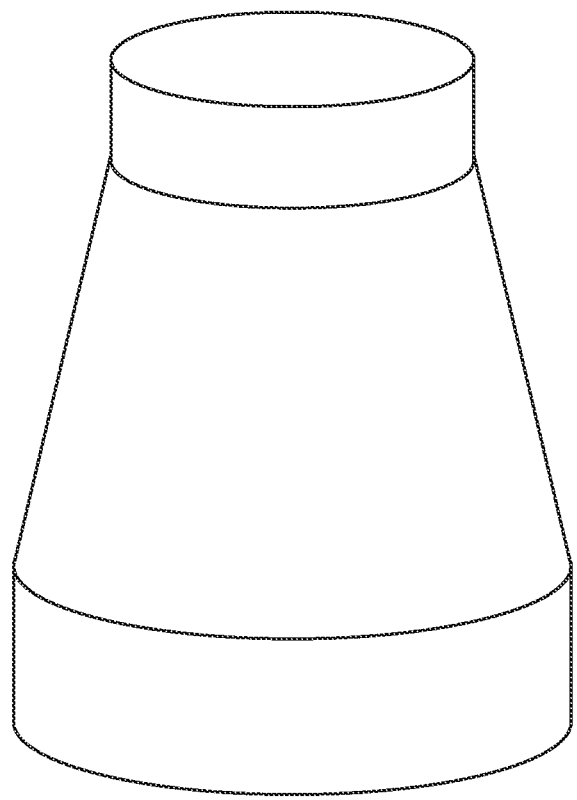

With reference to FIGS. 7 and 8 and according to an embodiment of the present disclosure, alternate bullets are shown having different shapes to provide further expansion of the anchor over such bullets. Both of the bullets are comprised of an upper cylindrical portion, a central conical portion and a lower cylindrical portion. As specifically shown in FIG. 7 the upper cylindrical portion is longer relative to the central conical portion and the lower cylindrical portion. As specifically shown in FIG. 8, the central conical portion is longer relative to the upper cylindrical portion and the lower cylindrical portion. A worker skilled in the art would appreciate that these bullets can be utilized with the system 10 as shown in FIGS. 3, 4 and 5.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

I claim:

1. An expansion anchor system comprising:
   a drill bit tool comprising at least one elongated axial aperture;
   a setting tool head removably secured to the drill bit tool, the setting tool head comprising:
      a stabilizer;
      a locking member; and
      at least one locking ridge;
   an anchor removably secured to the setting tool head, the anchor comprising:
      at least one carbide bit to expand a bore hole; and
      at least one receiving groove to lock with the locking member and transfer rotary movement from the setting tool head to the anchor; and
   a bullet connected to the anchor to facilitate a radial expansion of the anchor,
   wherein the stabilizer is positioned at a lowermost end of the setting tool head and is cylindrically shaped to fit into a cavity of the anchor and flushly against a crest of a threaded inner wall of the anchor.

2. The expansion anchor system of claim 1, wherein the drill bit tool further comprises an annual recession constructed and arranged to receive a plurality of ball bearings positioned on the setting tool head.

3. The expansion anchor system of claim 1, wherein the at least one elongated axial aperture of the drill bit tool locks into the at least one locking ridge of the setting tool head to transfer rotary movement from the drill bit tool to the setting tool head.

4. The expansion anchor system of claim 1, wherein the bullet has curved upper and lower surfaces and a sloping outer wall.

5. An expansion anchor system comprising:
   a drill bit tool comprising:
      at least one elongated axial aperture; and
      an annual recession;
   a setting tool head removably secured to the drill bit tool, the setting tool head comprising:
      a stabilizer;
      a locking member; and
      at least one locking ridge,
   wherein the annual recession of the drill bit tool is constructed and arranged to receive a plurality of ball bearings positioned on the setting tool head;
   an anchor removably secured to the setting tool head, the anchor comprising:
      at least one carbide bit to expand a bore hole; and
      at least one receiving groove to lock with the locking member and transfer rotary movement from the setting tool head to the anchor; and
   a bullet connected to the anchor to facilitate a radial expansion of the anchor.

6. The expansion anchor system of claim 5, wherein the at least one elongated axial aperture of the drill bit tool locks into the at least one locking ridge of the setting tool head to transfer rotary movement from the drill bit tool to the setting tool head.

7. The expansion anchor system of claim 5, wherein the bullet has curved upper and lower surfaces and a sloping outer wall.

* * * * *